(12) United States Patent
Pietraski et al.

(10) Patent No.: US 7,197,281 B2
(45) Date of Patent: Mar. 27, 2007

(54) METHOD AND SYSTEM FOR GENERATING CHANNEL QUALITY INDICATOR VALUES FOR CONTROLLING A TRANSMITTER

(75) Inventors: Philip J. Pietraski, Huntington Station, NY (US); Gregory S. Sternberg, Great Neck, NY (US); Rui Yang, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 96 days.

(21) Appl. No.: 10/869,672

(22) Filed: Jun. 16, 2004

(65) Prior Publication Data

US 2004/0266358 A1 Dec. 30, 2004

Related U.S. Application Data

(60) Provisional application No. 60/482,809, filed on Jun. 26, 2003.

(51) Int. Cl.
*H04B 17/00* (2006.01)
*H04J 3/16* (2006.01)

(52) U.S. Cl. .................. 455/67.11; 455/63.1; 370/437

(58) Field of Classification Search ............. 455/67.1, 455/63.1, 283, 67.11, 67.13, 423, 226.3, 226.1, 455/135; 375/295, 340; 370/437, 329, 310, 370/428

See application file for complete search history.

(56) References Cited

U.S. PATENT DOCUMENTS

2002/0147953 A1 10/2002 Catreux et al.
2003/0100269 A1* 5/2003 Lehtinen et al. .............. 455/69
2004/0219883 A1* 11/2004 Pauli et al. ............... 455/67.11
2004/0223507 A1* 11/2004 Kuchibhotla et al. ........ 370/428
2005/0003782 A1* 1/2005 Wintzell ................. 455/226.3
2005/0008103 A1* 1/2005 Sternberg et al. ........... 375/340
2005/0025254 A1* 2/2005 Awad et al. ................. 375/295
2005/0094596 A1* 5/2005 Pietraski et al. ............ 370/329
2005/0100038 A1* 5/2005 Pietraski et al. ............ 370/437

FOREIGN PATENT DOCUMENTS

EP 1289181 3/2003
WO 01/82521 11/2001

* cited by examiner

*Primary Examiner*—Melody Mehrpour
(74) *Attorney, Agent, or Firm*—Volpe and Koenig, P.C.

(57) ABSTRACT

A method and system for generating a channel quality indication (CQI) for a communication channel established between a transmitter and a receiver. A signal-to-interference ratio (SIR) estimate of the communication channel is calculated and a correction term is generated based on a data packet transmitted by the transmitter. A corrected SIR is generated by combining the SIR estimate and the first correction term. The corrected SIR is mapped to a CQI value. The CQI value is sent to the transmitter in order to adjust the configuration of the next data packet transmitted by the transmitter. The first correction term may be generated by subtracting a target packet error rate (PER) from a filtered binary signal derived from negative-acknowledgement (NACK) signals and acknowledgement (ACK) signals which respectfully indicate whether or not errors exist in data packets transmitted by the transmitter.

20 Claims, 3 Drawing Sheets

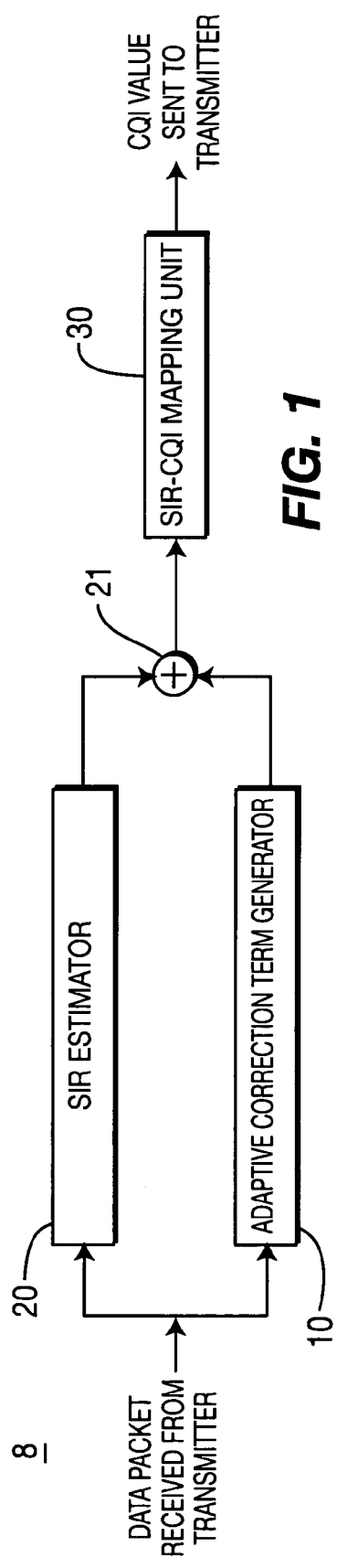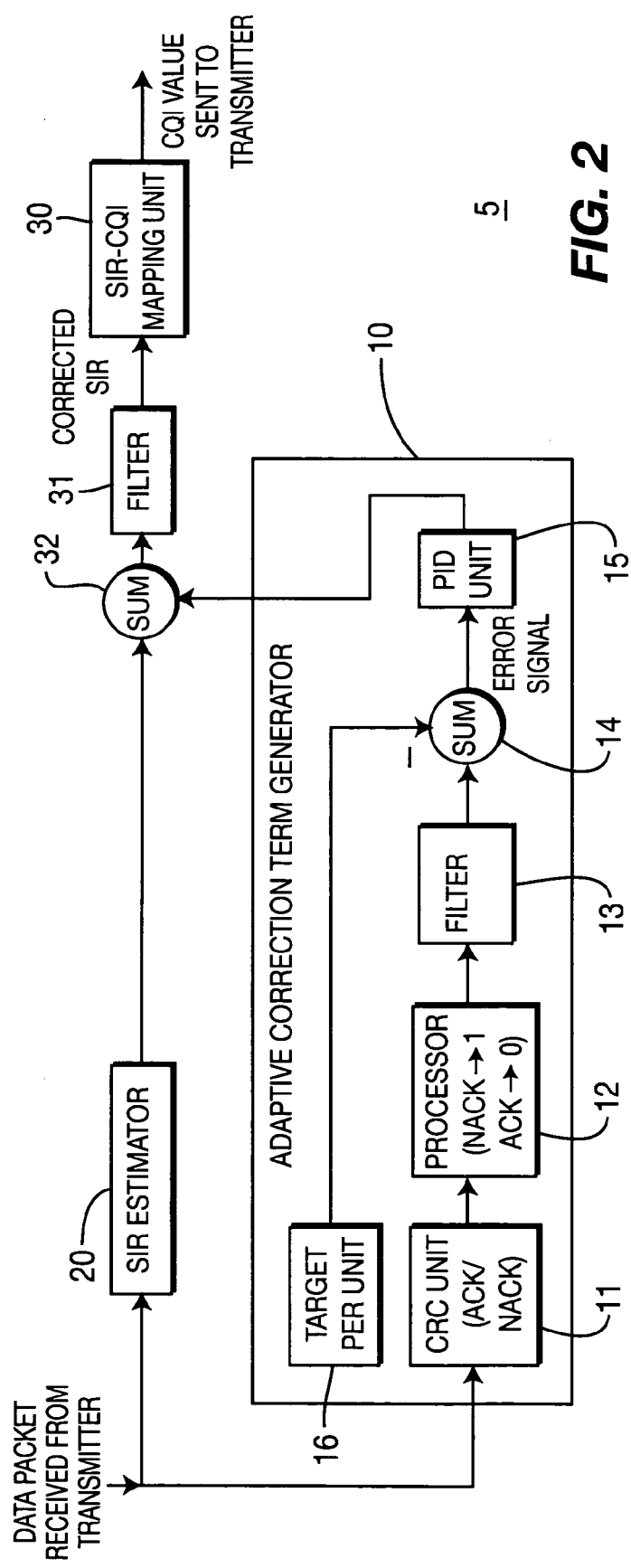

METHOD AND SYSTEM FOR GENERATING CHANNEL QUALITY INDICATOR VALUES FOR CONTROLLING A TRANSMITTER

CROSS REFERENCE TO RELATED APPLICATION

This application claims priority from U.S. provisional application No. 60/482,809 filed on Jun. 26, 2003, which is incorporated by reference as if fully set forth.

FIELD OF INVENTION

This invention relates to generation of a channel quality indicator (CQI) in wireless communications, and more particularly to a method for adaptive biasing of the signal-to-interference ratio (SIR) for CQI generation.

BACKGROUND

Adaptive Coding and Modulation (ACM) is an effective technique for providing link adaptation in both Uplink (UL) and Downlink (DL) communications. ACM is typically accomplished by algorithms working together in both the receiver and the transmitter. The receiver makes an estimate of the channel quality by measuring the SIR of one or more transmissions from the transmitter. The measured SIR is then used to compute a CQI.

Each CQI may correspond to a particular configuration of radio resources such as code rate and modulation type. After each SIR measurement is made, the CQI is computed. For example, the SIR is compared to a table of SIR-CQI pairs and the CQI value that yields the best performance, such as in terms of Packet Error Rate (PER) or throughput, is selected and sent back to the transmitter. The transmitter then selects a radio configuration that is no more aggressive than that indicated by the received CQI value. In an otherwise unpopulated cell, the transmitter would simply use a configuration consistent with the channel quality indicated by the CQI.

However, SIR alone does not give complete information about the quality of the channel. For example, in order to maximize data throughput, a channel with a large delay spread and/or a large Doppler spread should not be assigned as high of a CQI value. Additionally, the CQI will depend on the receiver design.

SUMMARY

The present invention provides a system and method for biasing the SIR value that is used for CQI generation in order to maintain a certain specified packet error rate (PER) as a mechanism to maximize data throughput. In this way, the proper CQI values are selected regardless of the type of propagation channel. Furthermore, additional algorithms such as Doppler estimators, or other feed forward correction terms, are not required but may be used in conjunction with the invention to further improve throughput performance.

In a preferred embodiment relating to Frequency Division Duplex High Speed Downlink Packet Access (FDD-HSDPA), a CQI table is specified such that each entry in the table corresponds to the code rate, modulation type, number of codes, and power offset that differ by 1 dB in required Common Pilot Channel (CPICH) SIR to the target PER. The CQI value is derived by adding a bias to the estimated CPICH SIR.

In the prior art, the bias was fixed and was determined primarily by the design of the table, the signaled power ratio of the pilot signal and the data signal, and the desired performance over a large class of channel types. By employing the present invention, the need to select a compromised fixed bias is removed. This is accomplished by monitoring the performance in terms of PER and adjusting the SIR bias to maintain a desired long-term average PER performance.

BRIEF DESCRIPTION OF THE DRAWING(S)

FIG. 1 is a block diagram of a system for generating CQI in accordance with the present invention.

FIG. 2 is a block diagram of a system for generating a CQI value by biasing SIR with a correction term created from an ACK/NACK signal according to a preferred embodiment of the present invention.

DETAILED DESCRIPTION OF THE PREFERRED EMBODIMENT(S)

Figure 3:
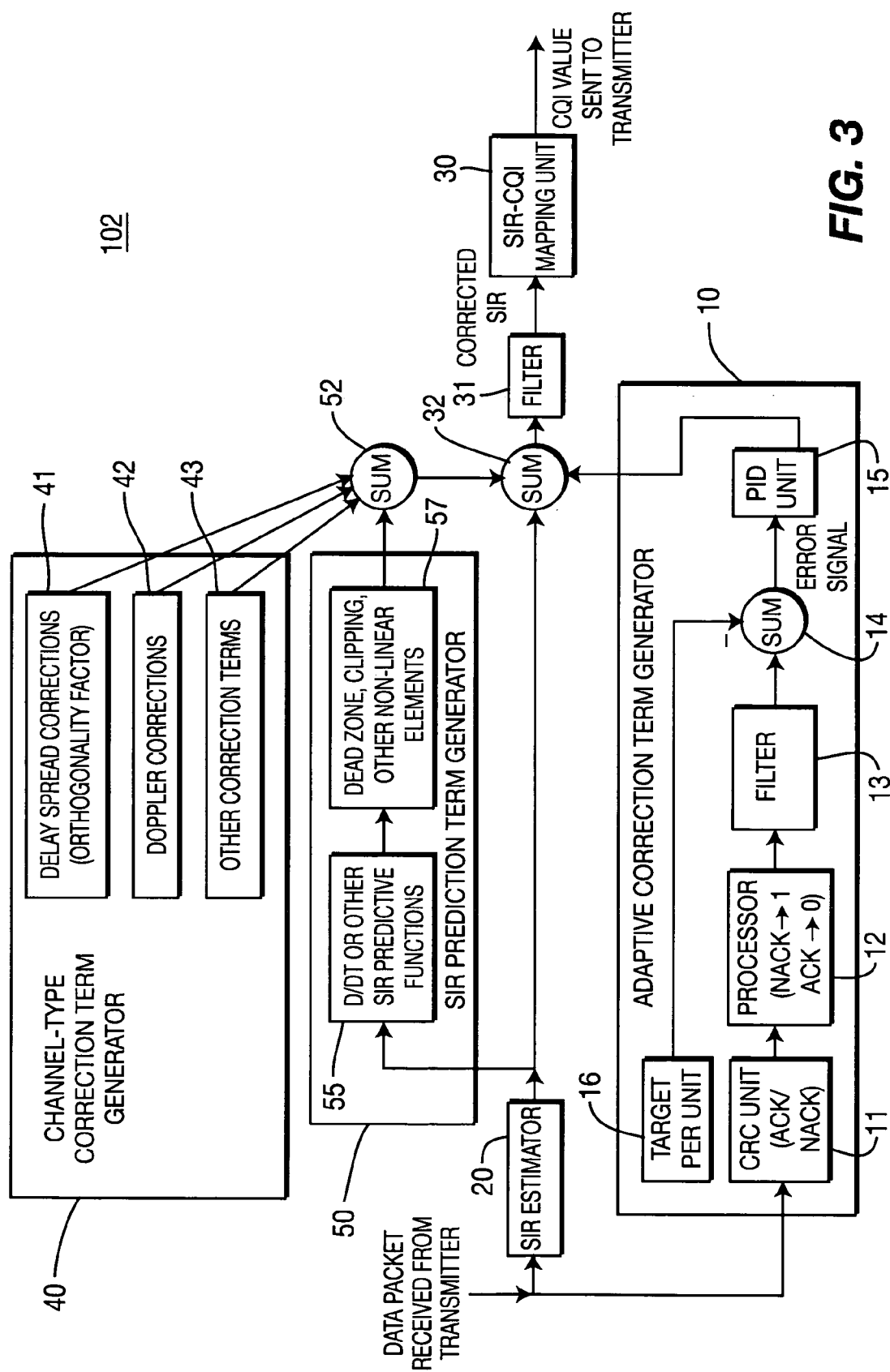
FIG. 3 is a block diagram of a system for generating a CQI value with several channel-type correction terms and a SIR prediction term in accordance with an alternative embodiment of the present invention.

The present invention will be described with reference to the drawing figures wherein like numerals represent like elements throughout.

The present invention is generally applicable to all modes of the Third Generation (3G) standards including Time Division Duplex (TDD), Frequency Division Duplex (FDD), Time Division Synchronous Code Division Multiple Access (TDSCMA) and Code Division Multiple Access 2000 (CDMA 2000) scenarios, but is envisaged to be applicable to other scenarios as well.

FIG. 1 is a block diagram of a system 8 for signal processing in accordance with the present invention. A data packet transmitted from a transmitter (not shown) is received by a receiver, only a portion of which is shown in FIG. 1. The system 8 includes a SIR estimator 20, an adaptive correction term generator 10, a combiner 21 and a SIR-CQI mapping unit 30. The received data packet is input into the SIR estimator 20 which calculates a SIR estimate of a communication channel established between the transmitter and the receiver based on the received data packet by a conventional method. The received data packet is also input into the adaptive correction term generator 10 and is processed for error detection. An ACK/NACK signal generated from the error detection process is used by the adaptive correction term generator 10 to generate a correction term to bias the SIR estimate. The SIR estimate and the correction term are combined at the combiner 21 to generate a corrected SIR.

The corrected SIR is mapped to a CQI value by the SIR-CQI mapping unit 30. The CQI value is reported to the transmitter in order to adjust the configuration of the next transmitted data packet. The CQI value ensures desired throughput performance by maintaining a PER that is close to the target PER. The purpose of maintaining a PER that is close to the target PER is that it optimizes the utilization of radio resources and, therefore, the data throughput of the system.

FIG. 2 is a block diagram of a system 5 for generating a correction term and CQI value from the corrected SIR according to the present invention. A received data packet is entered into the SIR estimator 20 and a SIR estimate of the communication channel established between the transmitter and the receiver is generated based on the received data packet. This is accomplished by a conventional SIR generation method which will not be further described.

The received data packet is also input into the adaptive correction term generator 10. The adaptive correction term generator 10 detects whether an error exists within the received data packet. The adaptive correction term generator 10 comprises a cyclic redundancy check (CRC) unit 11, a processor 12, a filter 13, a summer 14, a proportional integral derivative (PID) unit 15 and a target PER unit 16. The occurrence of the error is detected by the CRC unit 11. The CRC unit 11 generates an acknowledgement (ACK) signal if no error has been detected or a negative-acknowledgement (NACK) signal if an error has been detected. These ACK/NACK signals resulting from the computation of the CRC are mapped into '0s' and '1s' respectively by the processor 12. This signal is then preferably filtered by the filter 13 to provide a better long-term estimate of the PER of the current communication channel. It should, however, be understood that the filter 13 is not required. A simple Infinite Impulse Response (IIR) filter with a slowly decaying exponential impulse response can be used, but other filters may also be used.

The target PER unit 16 generates a target PER to ensure the desired performance, such as maximizing throughput. The required PER is defined as the PER required to properly decode a packet with a predetermined probability.

The target PER generated by the target PER unit 16 is subtracted from the filtered binary ACK/NACK signal generated from the processor 12 by the summer 14 to generate an error signal that represents a deviation of current performance of the receiver from the target performance of the receiver in terms of PER.

The PID unit 15, or other unit containing higher order linear or non-linear elements, processes the error signal. Simulations have shown that a proportional term alone provides some correction, and the combination of proportional and integral terms is sufficient to nearly completely correct the CQI estimates in terms of average PER requirements.

The value output by the PID unit 15 is added to the SIR estimate by a summer 32 to generate the corrected SIR value. The corrected SIR may be filtered further by a filter 31, if additional processing is desired. This filter 31 may include non-linear elements such as limiters and slew-rate limiters. The result is processed to generate proper CQI value through a SIR-CQI mapping unit 30. The mapping unit 30 may comprise a look-up table or other type of functional relationship which generates a predetermined value for CQI according to the input corrected SIR.

The CQI value is transmitted to the transmitter to adjust the signal configuration to obtain the best performance in terms of PER under the current channel conditions. The signal configuration that the transmitter may adjust includes code rate, modulation type, number of codes and power offset according to the CQI.

An alternative embodiment of the present invention shown in FIG. 3 is a system 102 having a channel-type correction term generator 40 and a SIR prediction term generator 50 to generate additional correction terms that can be used to bias and correct the SIR estimate in addition to the correction term generated as described with reference to FIG. 2. These terms may include delay spread corrections 41, Doppler spread corrections 42, battery voltage dependant losses introduced by the radio, or other channel-type corrections 43. As previously indicated, SIR alone does not completely define the quality of the channel. Large delay spreads and Doppler spreads have the potential to degrade performance of the receiver. Therefore, knowledge of these quantities can be used to improve the bias applied to the SIR, or alternatively to adjust the target PER.

The SIR prediction term generator 50 may also be employed to improve the bias by estimating what the SIR will be at a time (in the future) when the transmitter will transmit the next packet. Processing by the derivative of the SIR (d/dt) 55 leads to a very simple form of predictor, while other more complex predictors may be further used. The generated predictive terms may be processed by clipping, dead zoning or any other non-linear processing techniques 57.

It should be noted that the channel-type correction term generator 40 and the SIR prediction term generator 50 may be used alone or in combination with each other or with the adaptive correction term generator 10 to generate a SIR correction. These terms can be generated by conventional methods. Accordingly, these methods will not be further described hereinafter. These terms are used to correct the SIR value based on short term measurements of the channel type, and may be used in conjunction with the adaptive SIR biasing scheme of the present invention. The correction terms from the channel-type correction term generator 40 and from the SIR prediction term generator 50 are summed via a summer 52. The resulting composite error correction term is added by the summer 32 to generate a corrected SIR. The term "corrected SIR" has been used throughout to indicate an effective SIR that better conveys the net losses due to the channel, with its various parameters, and receiver losses.

Figure 4:
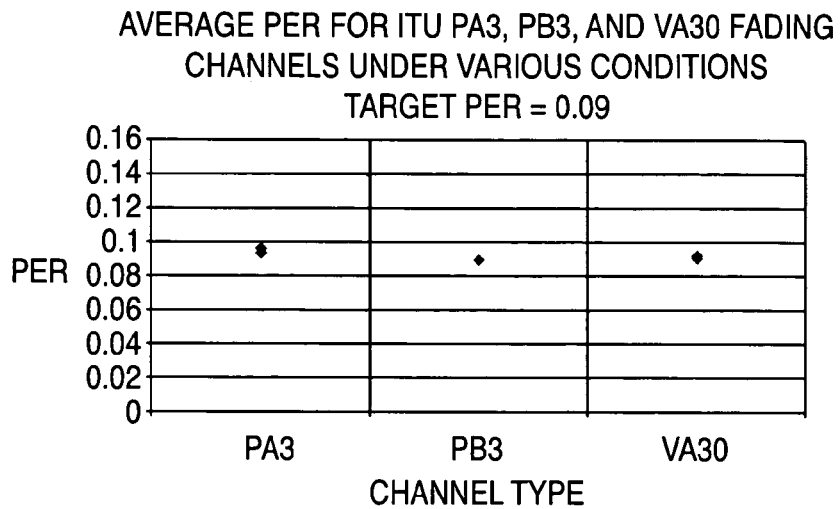
FIG. 4 is a signal diagram of the result of simulation for long-term PER for ITU channels under various levels of inter- and intra-cell interference.

FIG. 4 is a signal diagram of the results of simulation for long-term PER for several ITU channels, which are defined in 3GPP standard for performance verification under various levels of inter- and intra-cell interference. The channels are Pedestrian A 3 kmph (PA3), Pedestrian B 3 kmph (PB3), and Vehicular A 30 kmph (VA30). Each channel was simulated with all combinations of Ec/Ior=−3 and −6 dB and Ior/Ioc=0,5, and 10 dB (6 points in all) for 10,000 packets. Measurements of PER over the simulations in FIG. 4 show that the average resulting PER is maintained near the target PER for a wide class of channel types, intra-cell interference levels, and inter-cell interference levels.

Figure 5:
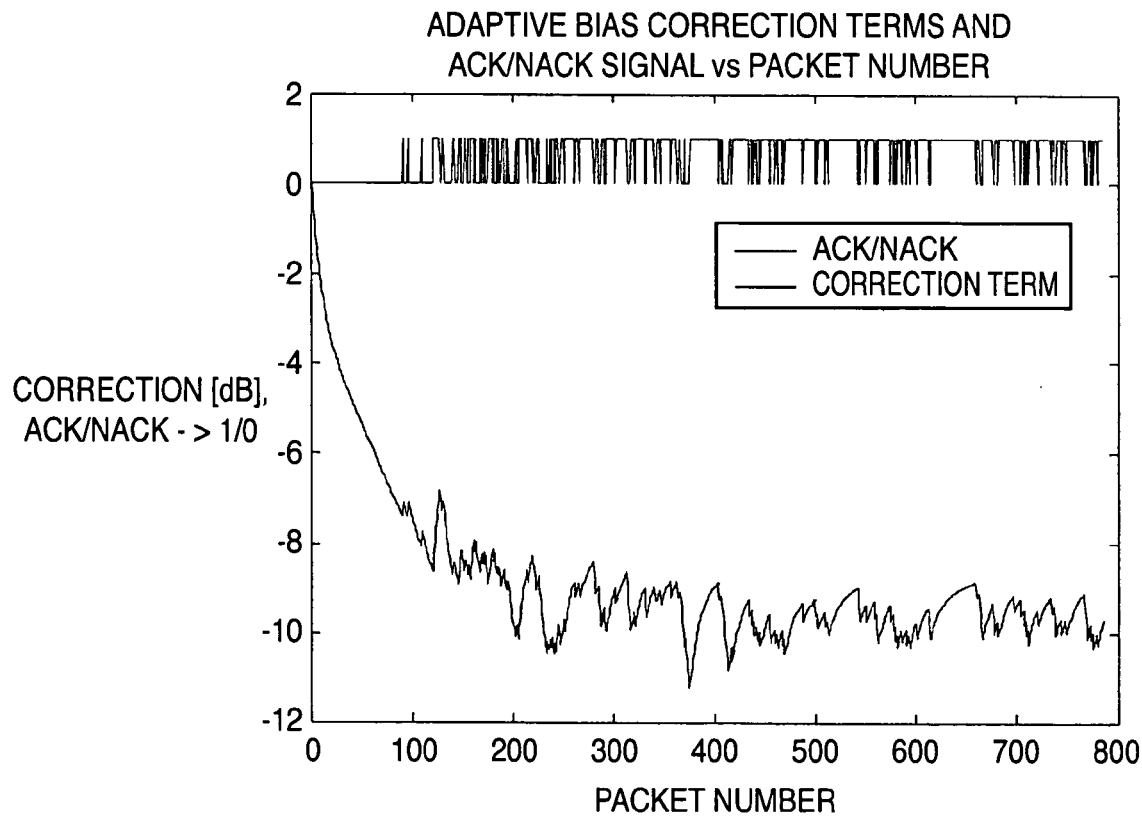
FIG. 5 is a signal diagram of the results of simulation of the ACK/NACK signal and adaptive bias correction signal generated according to the present invention.

FIG. 5 is a signal diagram of the results of simulation for the convergence of the adaptive bias term and the corresponding ACK/NACK signal in ITU PB3 fading channel. Notice that initially only NACKs (CRC failures) are observed. After the adaptive bias correction term of the present invention has biased the SIR estimate for CQI generation, ACKs (CRC successes) are more frequent. The average PER is maintained near the target PER after convergence, about 200 packets or about 0.4 sec in FDD-HSDPA, much faster than is expected to be required.

While this invention has been particularly shown and described with reference to preferred embodiments, it will be understood by those skilled in the art that various changes in forms and details may be made therein without departing from the scope of the invention as described above.

What is claimed is:

1. A method for generating a channel quality indication (CQI) for a communication channel established between a transmitter and a receiver, the method comprising:
  (a) calculating a signal-to-interference ratio (SIR) estimate of the communication channel based on a first data packet transmitted by the transmitter;
  (b) generating a first correction term based on the first data packet;
  (c) generating a CQI value by (i) combining the SIR estimate and the first correction term to generate a corrected SIR, and (ii) mapping the corrected SIR to the CQI value; and
  (d) reporting the CQI value to the transmitter in order to adjust the configuration of a second data packet transmitted by the transmitter.

2. The method of claim 1 further comprising:
  (e) generating a second correction term for Doppler spreading; and
  (f) combining the second correction term with the SIR estimate and the first correction term to generate the corrected SIR.

3. The method of claim 1 further comprising:
  (e) generating a second correction term for delay spreading; and
  (f) combining the second correction term with the SIR estimate and the first correction term to generate the corrected SIR.

4. The method of claim 1 further comprising:
  (e) determining whether errors exist within the first and second data packets.

5. The method of claim 1 wherein step (b) further comprises:
  (b1) generating an error signal by subtracting a target packet error rate (PER) from a filtered binary signal derived from negative-acknowledgement (NACK) signals and acknowledgement (ACK) signals which respectfully indicate whether or not errors exist in data packets transmitted by the transmitter; and
  (b2) generating the first correction term by processing the error signal and adding the processed error signal to the SIR estimate.

6. A system for generating a channel quality indication (CQI) for a communication channel established between a transmitter and a receiver, the system comprising:
  (a) a signal-to-interference ratio (SIR) estimator for calculating a SIR estimate of the communication channel based on a first data packet transmitted by the transmitter;
  (b) a first correction term generator for generating a first correction term based on the first data packet;
  (c) at least one summer for combining the SIR estimate and the first correction term to generate a corrected SIR; and
  (d) a SIR-CQI mapping unit for mapping the corrected SIR to a CQI value, wherein the CQI value is reported to the transmitter in order to adjust the configuration of a second data packet transmitted by the transmitter.

7. The system of claim 6 further comprising:
  (e) a second correction term generator for generating a second correction term for Doppler spreading, wherein the summer adds together the second correction term, the SIR estimate and the first correction term to generate the corrected SIR.

8. The system of claim 7 wherein the first correction term generator is an adaptive correction term generator and the second correction term generator is a channel-type correction term generator.

9. The system of claim 6 further comprising:
  (e) a second correction generator for generating a second correction term for delay spreading, wherein the summer adds together the second correction term, the SIR estimate and the first correction term to generate the corrected SIR.

10. The system of claim 9 wherein the first correction term generator is an adaptive correction term generator and the second correction term generator is a channel-type correction term generator.

11. The system of claim 8 further comprising:
  (e) a second correction term generator for generating a second correction term, wherein the summer adds together the second correction term, the SIR estimate and the first correction term to generate the corrected SIR.

12. The system of claim 11 wherein the first correction term generator is an adaptive correction term generator and the second correction term generator is a SIR prediction term generator.

13. The system of claim 6 further comprising:
  (e) a cyclic redundancy check (CRC) unit for determining whether errors exist within the first and second data packets.

14. The system of claim 6 wherein the first correction term generator generates an error signal by subtracting a target packet error rate (PER) from a filtered binary signal derived from negative-acknowledgement (NACK) signals and acknowledgement (ACK) signals which respectfully indicate whether or not errors exist in data packets transmitted by the transmitter.

15. The system of claim 14 wherein the first correction term generator comprises:
  (b1) a cyclic redundancy check (CRC) unit for receiving data packets from the transmitter and determining whether errors exist within the data packets;
  (b2) a processor for mapping the ACK and NACK signals into a binary signal;
  (b3) a first filter for filtering the binary signal to generate the filtered binary signal;
  (b4) a target packet error rate (PER) unit for generating the target PER;
  (b5) means for generating an error signal by subtracting the target PER from the filtered binary signal; and
  (b6) a proportional integral derivative (PID) unit for processing the error signal.

16. The system of claim 15 wherein the summer generates the corrected SIR by adding the processed error signal to the SIR estimate.

17. The system of claim 16 further comprising:
  (e) a second filter inserted between the summer and the SIR-CQI mapping unit for filtering the corrected SIR.

18. A system for generating a channel quality indication (CQI) for a communication channel between a transmitter and a receiver, the system comprising:
  (a) a signal-to-interference ratio (SIR) estimator for calculating SIR estimates of the communication channel based on data packets transmitted by the transmitter;
  (b) an adaptive correction term generator for generating an error signal by subtracting a target packet error rate (PER) from a filtered binary signal derived from negative-acknowledgement (NACK) signals and acknowledgement (ACK) signals which respectfully indicate whether or not errors exist in the data packets transmitted by the transmitter, wherein the error signal is used to correct the SIR estimates; and (c) a SIR-CQI unit mapping unit for mapping the corrected SIR to a CQI value, wherein the CQI value is reported to the transmitter in order to adjust the configuration of data packets transmitted by the transmitter.

19. The system of claim 18 wherein the adaptive correction term generator comprises:
(b1) a cyclic redundancy check (CRC) unit for receiving the data packets from the transmitter and determining whether errors exist within the data packets;
(b2) a processor for mapping the ACK and NACK signals into a binary signal;
(b3) a filter for filtering the binary signal to generate the filtered binary signal;
(b4) a target packet error rate (PER) unit for generating the target PER;
(b5) means for generating an error signal by subtracting the target PER from the filtered binary signal; and
(b6) a proportional integral derivative (PID) unit for processing the error signal.

20. The system of claim 18 further comprising:
(d) a SIR predictive term generator for generating correction terms based on the SIR estimates, wherein the correction terms and the error signal are used to correct the SIR estimates.

* * * * *

UNITED STATES PATENT AND TRADEMARK OFFICE
CERTIFICATE OF CORRECTION

| | | |
|---|---|---|
| PATENT NO. | : 7,197,281 B2 | Page 1 of 1 |
| APPLICATION NO. | : 10/869672 | |
| DATED | : March 27, 2007 | |
| INVENTOR(S) | : Philip J. Pietraski | |

It is certified that error appears in the above-identified patent and that said Letters Patent is hereby corrected as shown below:

IN THE SPECIFICATION

At column 2, line 41, after the word "Access", delete "(TDSCMA)" and insert therefor --(TDSCDMA)--.

IN THE CLAIMS

At claim 11, column 6, line 15, after the word "claim", delete "8" and insert therefor --6--.

Signed and Sealed this

Twenty-fifth Day of September, 2007

JON W. DUDAS
*Director of the United States Patent and Trademark Office*